US009272937B2

(12) United States Patent
Bioul et al.

(10) Patent No.: US 9,272,937 B2
(45) Date of Patent: Mar. 1, 2016

(54) GLASS MELTING FURNACE

(75) Inventors: Francois Bioul, Jumet (BE); Olivier Douxchamps, Jumet (BE)

(73) Assignee: AGC GLASS EUROPE, Brussels (BE)

(*) Notice: Subject to any disclaimer, the term of this patent is extended or adjusted under 35 U.S.C. 154(b) by 496 days.

(21) Appl. No.: 13/389,192

(22) PCT Filed: Aug. 5, 2010

(86) PCT No.: PCT/EP2010/061396
§ 371 (c)(1),
(2), (4) Date: Feb. 6, 2012

(87) PCT Pub. No.: WO2011/015618
PCT Pub. Date: Feb. 10, 2011

(65) Prior Publication Data
US 2012/0135363 A1    May 31, 2012

(30) Foreign Application Priority Data
Aug. 6, 2009   (EP) .................................. 09167389

(51) Int. Cl.
C03B 5/237    (2006.01)
C03B 5/235    (2006.01)
C01B 13/02    (2006.01)

(52) U.S. Cl.
CPC ........... C03B 5/2353 (2013.01); C01B 13/0255 (2013.01); C01B 2210/0046 (2013.01)

(58) Field of Classification Search
CPC ............... C01B 13/0255; C01B 2210/0046; C03B 5/2353
USPC ...................... 95/54; 432/180, 186
See application file for complete search history.

(56) References Cited

U.S. PATENT DOCUMENTS

| 4,636,226 | A | * | 1/1987 | Canfora ........................... 95/138 |
| 4,895,710 | A | * | 1/1990 | Hartmann et al. ............ 423/351 |
| 5,032,346 | A | * | 7/1991 | Girieud .......................... 376/216 |
| 5,753,007 | A | * | 5/1998 | Russek et al. ...................... 95/41 |
| 5,888,272 | A |   | 3/1999 | Prasad et al. |
| 5,910,238 | A | * | 6/1999 | Cable et al. ................... 205/634 |
| 6,149,714 | A |   | 11/2000 | Kobayashi |
| 6,382,958 | B1 | * | 5/2002 | Bool et al. ........................ 431/2 |

(Continued)

FOREIGN PATENT DOCUMENTS

| EP | 0 882 486 |   | 12/1998 |
| EP | 1 172 135 |   | 1/2002 |
| GB | 2064749 | * | 6/1981 |

OTHER PUBLICATIONS

International Search Report Issued Oct. 20, 2010 in PCT/EP10/61396 Filed Aug. 5, 2010.

(Continued)

Primary Examiner — Steven B McAllister
Assistant Examiner — Steven Anderson, II
(74) Attorney, Agent, or Firm — Oblon, McClelland, Maier & Neustadt, L.L.P.

(57) ABSTRACT

The present invention relates to a furnace (12) for melting heated glass using burners (13), wherein the combustion energy is at least partially produced by oxy-fuel combustion, and wherein at least a portion of the oxygen used in the burners (13) is produced by separation, on a ceramic separation membrane (18), from a gaseous mixture including oxygen, the oxygen from the separation being directly channeled into at least one burner (13).

11 Claims, 2 Drawing Sheets

(56) References Cited

U.S. PATENT DOCUMENTS

| | | | |
|---|---|---|---|
| 6,519,973 B1* | 2/2003 | Hoke et al. | 65/134.4 |
| 2005/0071093 A1* | 3/2005 | Stefan | 702/60 |
| 2007/0134604 A1 | 6/2007 | Sirman et al. | |
| 2008/0229727 A1* | 9/2008 | Wang et al. | 60/273 |
| 2009/0044598 A1* | 2/2009 | Kuisell et al. | 73/23.31 |
| 2010/0316969 A1* | 12/2010 | Amirat et al. | 432/11 |
| 2012/0135362 A1* | 5/2012 | Bioul et al. | 432/180 |

OTHER PUBLICATIONS

U.S. Appl. No. 13/389,164, filed Feb. 6, 2012, Bioul, et al.

* cited by examiner

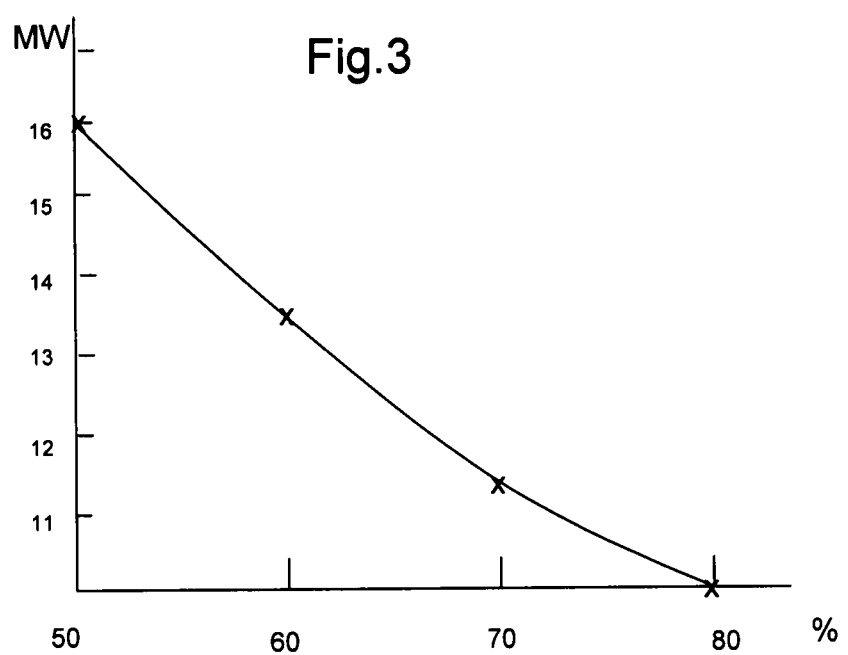

GLASS MELTING FURNACE

The present invention relates to glass melting furnaces in which the melting energy is essentially produced by burners supplied with fuel and oxygen or gas that is very rich in oxygen. These furnaces are usually referred to as "oxy-combustion" furnaces. It also relates both to furnaces, in which oxy-combustion is used in a complementary manner and what is referred to in particular as "boosting", as well as furnaces in which most if not all the combustion is conducted with oxygen.

Oxy-combustion allows an energy saving at least because the energy from the combustion gases is in part not absorbed by the nitrogen in the air. In traditional furnaces, even if a portion of the energy carried with the nitrogen is recovered in the regenerators, the fumes ultimately discharged still carry a significant portion thereof. The presence of nitrogen contributes to this loss.

Moreover, the reduction of energy consumption per production unit in question has the advantage of thus restricting the carbon dioxide emissions, which can reach 25%, and therefore meeting statutory requirements in this field.

The presence of nitrogen is also a source of the formation of so-called NOx oxides, the emission of which is forbidden in practice because of damage associated with the presence of these compounds in the atmosphere. The users have endeavoured to operate the furnaces in conditions that limit emissions as far as possible. In the case of glassmaking furnaces, these practices are not sufficient to meet the very strict standards in force, and it is necessary to undertake costly measures to control pollution from emissions by using catalysts.

The use of oxygen enables the problems associated with nitrogen from the air to be excluded, if not fully, then at least to a very large proportion in the order of 90%.

Despite the advantages outlined above, the use of oxy-combustion in large glassmaking furnaces is yet to be developed. The reasons for this are varied. Firstly, the use of oxygen is necessarily more costly than that of air. Moreover, for the economic balance of using oxy-combustion to be positive requires that different technical problems are overcome, and in particular that of the thermal fluxes comprising the recovery of a significant portion of the heat of the fumes.

The technique described in the unpublished patent application PCT/EP2009/053500 enables the energy yield to be optimised overall by proposing a method for recovering the heat from the fumes to reheat the oxygen used. This optimisation nevertheless involves the use of specially adapted devices, in particular to satisfactorily resist corrosion that is associated with hot oxygen.

The energy recovered to heat the oxygen does not use up that carried by the fumes.

In practice, the energy from the fumes is more than that required to bring the different supplies of the furnace to suitable temperatures for operation. It is firstly a matter of heating the fuel. It is also a matter of preheating the raw materials. With all these elements the conditions of exchange, which take into account the nature of the constituents or the manner in which they can be used, limits the amount of energy that can be recovered for the actual operation of the furnace.

The fuel, whether liquid or gaseous, cannot withstand excessive temperatures. The temperature of the oxygen is limited by that which the devices it circulates in can withstand. In practice, the resistance of the alloys of the conduits used will not go beyond 900-950° C. when operation over long periods must be assured. Also, the raw materials cannot withstand too significant an increase in their temperature without the risk of causing agglomerations that makes working with them more complicated.

A solution to improve the economic balance is to incorporate the production of oxygen at the site of use. This means no specialised companies in its production need to be purchased, and also removes the requirement for transport means or storage arrangements or both.

However, the production of oxygen raises other questions. The usual techniques for the production of oxygen by liquefaction and distillation from air, of the type used by large producers of industrial gases, require extensive installations that can only be profitable with very large production volumes. The quantities necessary for the supply of glassmaking furnaces, even if significant, are usually insufficient to justify such an investment.

Moreover, techniques for oxygen production are known for applications that only require limited quantities of this gas. Among these techniques it has been proposed to use the separation of oxygen from a gaseous mixture, and in particular from air, by means of membranes formed from a selection of materials, also referred to by the term solid electrolytes, that are able to react with oxygen to ionise it on a face of the membrane, to transport these ions through this and reconstitute the gaseous oxygen on the other face of the membrane. Materials of this type are described, for example, in U.S. Pat. No. 5,240,480 or in patent application WO 2008/024405.

To obtain significant yields, the separation of oxygen via a membrane has to proceed at elevated temperature and also a significant difference in the oxygen partial pressure must be maintained on either side of the membrane. For these reasons, the economy of implementing these techniques depends greatly on the precise energy balance of the operation of the installations in question.

The inventors have shown that by an appropriate choice of conditions, the production of oxygen using the technique of separation by means of membranes enables both the technical and the economic requirements associated with furnaces operating by oxy-combustion, or at least operating to a significant degree in oxy-combustion mode, to be met.

Therefore, the invention relates to glassmaking furnaces supplied at least partially by means of oxy-combustion and in which a portion of the oxygen used is produced by separation via a solid electrolyte-type of membrane from a gaseous mixture containing oxygen.

The efficiency of the separation of oxygen via the solid electrolyte membrane is dependent on conditions that make this operation relatively complicated. Firstly, the ion transport in the membrane needs relatively elevated temperatures. For a significant transport, the temperature is advantageously higher than 550° C. and preferably the temperature is at least equal to 600° C.

If the temperature is as high as possible, the practical limits are associated with the devices in which the gases in question, and in particular oxygen, circulate. The alloys most resistant to hot oxygen are satisfactorily resistant up to about 950° C. Devices of this type, i.e. heat exchangers, are described, for example, in patent application WO 2008/141939. Beyond these temperatures, the risk of deterioration significantly reduces the service life of the devices in question. In practice, the temperature is advantageously at most equal to 900° C.

Furnaces for melting glass require a significant energy supply. Consequently, the oxygen consumption is also relatively significant. Extraction of the oxygen must result in high flow rates and should require only installations compatible with economical operation. To have appropriate flow rates, it is necessary to maintain a sufficient difference in the oxygen partial pressure on either side of the membrane.

While the supply pressure of the burner can be relatively low, in the order of some tens of kPa, it is necessary to supply the separation device at an elevated pressure. The greater the difference, the more significant the efficiency of the device is, all other factors being equal. However, the pressure is limited for practical reasons. The selected pressure is advantageously higher than $1.10^6$ Pa. In a practical manner, in particular taking into consideration the resistance of the membranes, it is preferable to not exceed pressures in the order of $5.10^6$ Pa. Pressures of $1.10^6$ to $2.10^6$ Pa constitute an advantageous compromise between the efficiency, on the one hand, and the difficulties of operating devices withstanding very high pressures.

Oxygen extracted by separation using a membrane is in temperature conditions that assist good combustion efficiency. Moreover, at the temperatures in question it is preferable to limit the course followed by the oxygen to the burner to limit the risks of deterioration of the devices in contact with this oxygen. Therefore, it is particularly advisable to use oxygen immediately after its extraction, and thus locate the extraction means comprising the membrane close to the burners of the furnace.

It is noteworthy that in the techniques described above, in particular in the unpublished application PCT/EP2009/053500, the oxygen supplying the oxy-combustion had to be heated in specially designed exchangers. These exchangers had to be located close to the burners for the reasons outlined above. In the embodiment proposed by the invention, the oxygen from the extraction devices is already at elevated temperature. It is therefore possible and advantageous to economise on the exchangers in question.

The energy necessary for heating the gaseous mixture from which the oxygen is extracted is advantageously supplied by the heat of the fumes. This transfer is achieved in several ways, either by heat exchange, or indirectly by using the energy of the fumes to operate the compressor directing the gaseous mixture from which the oxygen is extracted in suitable conditions, or also preferably by implementing these two types of transfer.

While it is conceivable to directly heat the gaseous mixture from which the oxygen is extracted, for reasons relating to the equipment used and the overall economy it is preferable to conduct a double exchange, as indicated below with respect to the examples. A heat transfer is conducted in a first exchanger, in which both the fumes and a fluid heat-exchange medium circulate. This latter is advantageously formed from air.

The gaseous mixture, from which the oxygen is extracted, is reheated after compression in secondary exchangers by means of the heat-exchange medium heated in the first exchanger. In general, the compression of the gaseous mixture is accompanied by a significant increase in temperature taking into account the pressure required for passage through the membrane. Depending on the type of compressor used, it can be preferable to conduct a cooling of the compressor to improve its efficiency. In all cases, even in that of a cooled compressor, the gas retains an increased temperature. Working from an ambient temperature, the temperature increase following the compression can reach and even exceed 350° C. In practice, the best overall conditions lead to the choice of a temperature preferably in the order of 200° to 300° C.

The temperature of the fumes at the outlet of the primary exchanger is preferably maintained above that of condensation of the sulphates present in the fumes, in other words above 800° C. Premature fouling of the exchanger is prevented in this way. It should be noted in this regard that the oxy-combustion mode of operation allows the sulphate content in the fumes to be restricted. The reason for sulphates being present in the composition is to facilitate the refining of the molten glass. In the oxy-combustion method of melting, the presence of a high water content in the atmosphere is a favourable factor for the refining. Therefore, the sulphate content is advantageously reduced to such an extent that the fumes can be discharged while adhering to the regulatory conditions without it being necessary to desulphurise them, as in the case of furnaces operating in the traditional manner using aero-combustion. In this case, only a dust extraction of the fumes is conducted before they are discharged.

The temperature of the heat-exchange medium at the outlet of the primary exchanger does not exceed the outlet temperature of the fumes. As an indication, the temperature reached by the heat-exchange medium remains about 50° C. lower than that of the fumes at the outlet of the exchanger when the fluxes are in the same direction in the exchanger, in other words when the hottest fumes are first in contact with the gaseous mixture at ambient temperature. In the same way, the reheating of the compressed mixture remains at temperatures lower than that of the heat-exchange medium. In this preferred configuration, the temperature of the compressed gaseous mixture is further advantageously increased to reach the most efficient temperature for extraction of the oxygen via a membrane. This increase in temperature is obtained, for example, by reheating the gaseous mixture in a boiler to reach the temperatures required for the oxygen extraction ranging up to 900-950° C. for the highest ones.

The gaseous mixture at elevated pressure and temperature is then passed to the membrane extractor. The extraction yield of the membrane is dependent on the temperature and pressure of the treated membrane, but also on the initial oxygen content, the imposed flow rates and, of course, the efficiency of the membrane for the same exchange surface area.

Without excessively increasing the exchange surface area of the membrane, which results in too significant an equipment investment, commercially available membranes allow extraction yields, for example, of 70% and even 80% to be reached working from atmospheric air.

The gaseous mixture after extraction of most of the oxygen is still at elevated temperature and pressure. In the case where this initial mixture consists of air, the gas after extraction of the oxygen still represents at least 80% of the initial volume. The energy carried by this gas is considerable. It is advantageously recovered in the technique according to the invention. It can serve in particular to drive the turbine compressor unit that supplies the compressed gaseous mixture.

The hot oxygen exiting from the extraction device is advantageously directed to the burners of the furnace. In view of its temperature, it can be used without additional heating.

The devices conveying the hot oxygen to the burners must be resistant to the particularly aggressive conditions they are exposed to. These particular conditions drastically restrict what elements make up these devices. Not only is it necessary to reduce as far as possible the path length separating the extraction unit from the burner, but these devices must also comprise a minimum number of elements that lead in particular to feed losses. As an indication, it is practically out of the question to provide valves to regulate the flow rate. Advantageously, these devices are restricted to conduits, possibly with static distributors supplying several burners.

Despite the equipment limitations associated with the use of oxygen at very high temperature, it is necessary to control the flux of oxygen recovered at the outlet of the extraction devices in that this flux determines the operation of the burner or burners supplied. According to the invention, this measure is advantageously conducted directly by determining the proportion of oxygen in the starting gaseous mixture as well as that of the residual oxygen at the outlet of the extraction device. It is thus possible to determine from the difference the flux of extracted oxygen sent to the burners.

Measurement of the oxygen content in the mixture after extraction via the membrane is conducted, for example, by means of sensors of the type formed by a zirconium oxide-based electrode such as those available from STG in Cottbus for measuring the oxygen in combustion fumes.

Once the measurement of the flux of extracted oxygen on the membrane has been conducted, the supply of the burners can then be adjusted upstream of the extraction device using one or more parameters likely to influence this flux: temperature, pressure, flow rate of the treated gaseous mixture.

In the event that the flux of extracted oxygen could not be controlled to supply the burners in sufficient quantity, it is possible to supplement this flux by an oxygen supply from an additional reserve. In this case, so as not to create an imbalance in the extraction conducted on the membrane, it is necessary to conduct this additional oxygen directly to the burner and preferably by means of an independent injector.

Whatever implementation is chosen for the invention, the recovered energy is not normally used up in the techniques for oxygen production that have just been described. The combustion fumes of the furnace are still at an elevated temperature after exchange in the first exchanger and dust extraction. Therefore, in view of the large quantity thereof, it is desirable to recover the energy they carry, for example, by conducting a co-generation operation. The same applies to the gaseous flux depleted of oxygen. After its use in compressing the energy supply, the gaseous mixture is still at elevated temperature and can be used to supplement that coming from the fumes. Finally, the fumes coming from the boiler for reheating the compressed gaseous mixture can also be added thereto.

The invention is described in detail below with reference to the sets of drawings, wherein:

FIG. 3 is a diagram showing the relation between the energy consumed in the oxygen production process as a function of various extraction efficiency conditions of the membranes used.

FIG. 1 shows a diagram of the operation of an oxy-combustion furnace such as that described in the patent application PCT/EP2009/053500.

Figure 1:
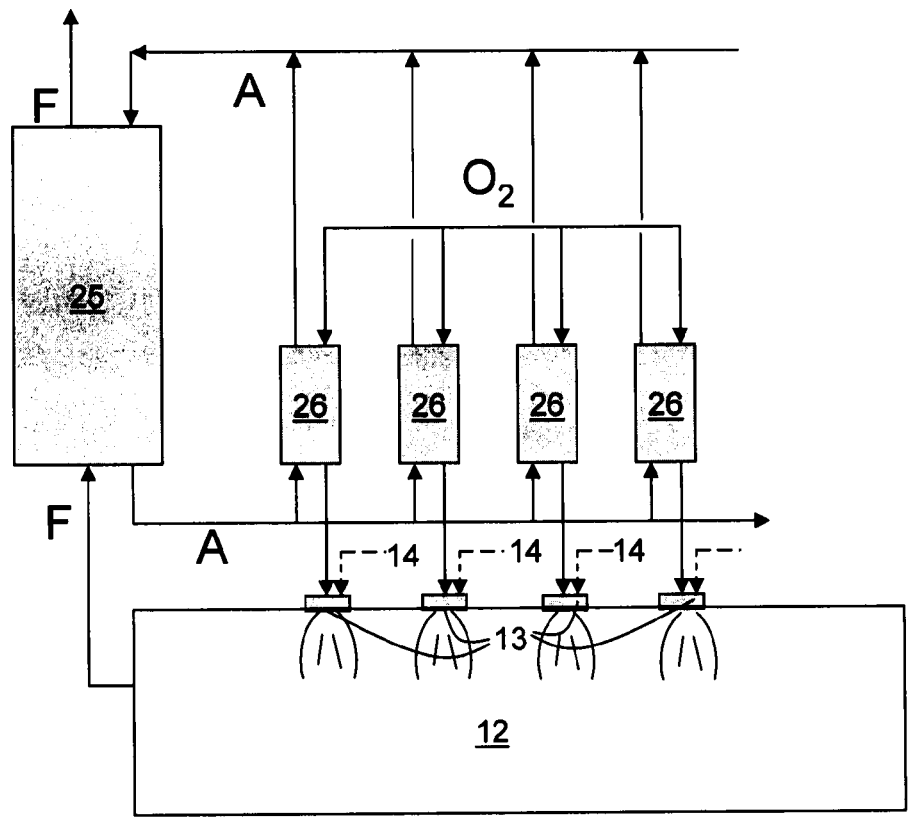
FIG. 1 is a diagram of the operation of an oxy-combustion furnace including heating of the oxygen.

The furnace 12 shown is of the type used in large-capacity glass production plants such as those feeding the production of float glass. It schematically shows 4 burners 13. In practice, ten burners are necessary in large furnaces. The diagram only shows half the elements: burners, circuits and exchangers located on a single side of the furnace. These elements are normally arranged on both sides for a better distribution of energy over the entire surface of the bath.

The burners receive the fuel via conduits 14. They also receive hot oxygen coming from a reheating unit. It is advantageous to conduct the heating of the oxygen in two stages taking into account the requirements specific to this technique.

The arrangement comprises the recovery of the fumes F exiting from the furnace. These fumes pass into a recuperator 25 where they reheat an intermediate fluid A, for example, air, nitrogen, $CO_2$ or any appropriate fluid. This fluid circulates in a loop, for example, between this recuperator 25 and one, or preferably several, exchangers 26, in which it heats the oxygen.

Taking into account the difficulties associated with conveying hot oxygen, the heating of the oxygen is preferably conducted close to the burners, in which this oxygen is consumed. For this reason and also because it is necessary to control the flow rate of each burner, it is necessary to increase the number of exchangers that supply each one or a small number of burners as appropriate.

In FIG. 1 each burner 13 is supplied by an exchanger 26.

The air is returned to the recuperator 25, for example, after preheating the oxygen. It can also be used together with the fumes for a co-generation operation.

In this diagram all the oxygen is supplied from a storage reservoir possibly connected to a central production unit by gas pipeline when distribution conditions permit.

Figure 2:
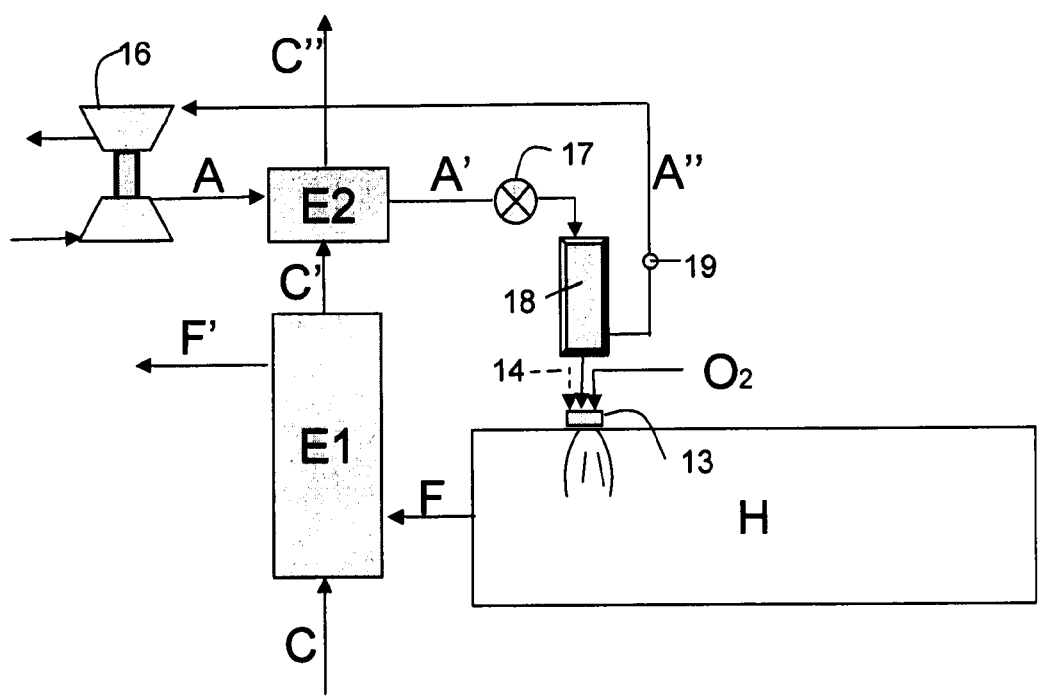
FIG. 2 is a diagram of the operation according to the invention.

FIG. 2 schematically shows the basic operating principle of a furnace comprising a unit for the production of oxygen by extraction via a membrane. Subsequently, it concerns the entire supply of oxygen by this particular source. It is also possible to ensure that only part of the oxygen supply comes from this method of production. However, it is preferred that at least 50% of supply comes from oxygen extracted via a membrane.

As previously, the furnace H comprises a series of burners 13. Only one of these is shown for reasons of clarity. The burner 13 is supplied with fuel at 14, as previously. Moreover, it receives hot oxygen directly from a membrane extractor 18. If the production of the extractor is not adequate to supply the burner in the chosen mode, an additional supply of oxygen can be conducted directly at the burner, if necessary, via an injector that can be separate from that supplied by oxygen produced by extraction. This supply is shown schematically by the arrow $O_2$.

The additional supply indicated above is also useful in possible maintenance operations on one of the extraction devices that cause brief interruptions to the extraction of oxygen. In this case, so as not to disturb the balance of operation of the furnace, it is preferable to keep all burners in operation and some at reduced capacity, if need be. The additional supply is then momentarily the only activity on the burner concerned.

The fumes F exiting from the furnace are passed into an exchanger E1, as previously. As an indication, in the case of a melting furnace producing 600 tonnes of glass per day, the fumes have a flux of 20000 $Nm^3/h$ at a temperature in the order of 1200-1300° C.

The dimensions and flow rate of the exchanger E1 are chosen such that the fumes exiting from it F' are still at a temperature higher than 800° C. At these temperatures it is advantageous to recover their energy in a co-generation process, for example.

In the chosen representation the fumes circulate in the same direction as the heat-exchange gaseous mixture C that they reheat. The diagram shows a recuperator comprising a single stage. In practice, it is formed from several stages. The exchange in E1 is conducted, for example, with air entering at ambient temperature. At the outlet C' the temperature of the air that is as high as possible still does not exceed about 750° C., taking into consideration the outlet temperature of the fumes. In the case where a higher temperature is preferred, the circulation in the exchanger E1 must be conducted in counterflow.

The flux of reheated air can reach 18500 $Nm^3/h$. It supplies a series of secondary exchangers E2, in which the compressed air A coming from a turbine compressor 16 circulates.

After passing into the exchanger E2 the air C", although cooled, still remains at about 450-520° C. and can also be used in a co-generation unit.

The air A exiting from the compressor 16, the flow rate of which is 36 000 Nm³/h, for example, is at a pressure in the order of 1.5 to 2.10⁶ Pa and its temperature increases to about 300° C. After passing into the exchanger E2, it exits as A' at about 500-550° C. Advantageously, it is reheated again by passing into a boiler 17 to reach the most favourable temperatures for membrane extraction. It is brought to 900° C., for example, still in the pressure conditions established at the compressor 16.

The hot air under pressure passes onto the membrane extractor 18. The extracted oxygen is immediately directed to the burner 13. The air A" depleted of oxygen still under a pressure of 1.5 to 2.10⁶ Pa has a flux in the order of 30 000 Nm³/h and a temperature in the order of 850° C., and this with an oxygen extraction yield of 80%.

Taking into account its characteristics, the depleted air A" is advantageously used to activate the turbine of the compressor 16 and again possibly discharges a surplus of energy that can also supply the co-generation unit.

The depleted air A" exiting from the extractor is advantageously analysed by means of a sensor 19 to indirectly determine the quantity of oxygen supplied to the burner. If necessary, an addition of oxygen is made directly to the burner shown by the arrow $O_2$.

The implementation of the technique according to the invention allows appreciable economic savings to be achieved compared to operation of the furnace supplied by oxygen in the conditions employed by industrial gas producers. However, the saving is dependent on the efficiency of the elements used. The efficiency of the membrane extraction and that of the turbo-compressor processing the gaseous mixture from which the oxygen is extracted play a particularly significant part in this balance.

In the best operating conditions such as those indicated above and with the appropriate dimensions for the envisaged flow rates, the oxygen extraction plants allow yields of not less than 65% to be achieved. Yields in the order of 70-75% extraction are reasonably possible. The best implementations can reach 80% extraction.

An analysis of the energy necessary for operation of the whole of the oxygen production in the method according to the invention shows the significance of operating with the most complete extraction possible. FIG. 3 shows the electric power necessary for oxygen production for a furnace producing 600 tonnes/day of glass as a function of the extraction efficiency. The power is reduced from 16 MW to 10 MW when the extraction efficiency passes from 50% to 80%.

The isentropic efficiency of the turbo-compressor varies in particular as a function of the temperature of the compressed gases. The less the outlet temperature is elevated, the better the efficiency will be. At 300° C. this can reach 90% and is only 80% at 380° C. The choice of too high a temperature therefore allows the efficiency to be improved. Conversely, it is necessary to reheat the gaseous mixture more intensively. Therefore, the user has some latitude depending on the respective costs of the energy used in these different options, said cost very clearly taking into account the energy that can be recovered at the different stages and the optimisation of its use. The efficiency usually sits between 75% and 90%.

The analysis of the compared systems takes into consideration the energy "cost" of the production of oxygen by traditional cryogenic methods and also by membrane extraction devices. Comparisons are conducted taking into account the various elements that enable the energy applied at different stages of use to be recovered, as already described previously.

Except for investment, the respective energy costs of methods for the production of oxygen by cryogenics and by extraction are the deciding factors of the economic advantage achieved. In all the envisaged cases, the implementation of the invention proves to be advantageous as soon as the efficiency of the extraction membranes exceeds 50%. This advantage obviously increases with the efficiency of the membrane.

Overall, the saving in the cost of oxygen when this is purchased from suppliers can vary from 10% to 40%. Since oxygen represents a significant part of the operating cost in the case of oxy-combustion, the implementation of the invention proves to be very advantageous.

The invention claimed is:

1. A glass melting furnace system, comprising:
   an oxy-combustion burner,
   a glass melting furnace, and
   an extraction device comprising a separation membrane,
   wherein the glass melting furnace is configured to convey oxygen immediately and directly to the oxy-combustion burner from the extraction device, and
   the extraction device comprises a ceramic separation membrane configured to separate oxygen from a gaseous mixture comprising oxygen at a temperature of 600-950° C. at a gaseous mixture pressure of not less than $1 \times 10^6$ Pa, the glass melting furnace system further comprising:
   an oxygen reservoir,
   a first heat exchanger, and
   a second heat exchanger,
   wherein
   the glass melting furnace system is configured to circulate combustion gases from the oxy-combustion burner and a fluid heat-exchange medium through the first heat exchanger,
   the second heat exchanger is configured to heat the gaseous mixture with the fluid heat-exchange medium, and
   the furnace is configured to regulate oxygen supply to the burners with the reservoir and configured to supply oxygen from the reservoir directly into the burner or in the immediate vicinity thereof by separate injection.

2. The glass melting furnace system of claim 1, configured to control a flow rate of oxygen supplying the burner dependent at least partially on temperature, pressure, and flow rate of the gaseous mixture.

3. The glass melting furnace system of claim 1, configured to determine a difference oxygen content of the gaseous mixture entering the extraction device and of the gaseous mixture after the ceramic separation membrane, thereby measuring a flux of oxygen separated from the gaseous mixture.

4. The glass melting furnace system of claim 3, further comprising:
   a ceramic oxide electrode configured to measure residual oxygen content of the gaseous mixture after the ceramic separation membrane.

5. The glass melting furnace system of claim 1, configured to supply oxygen from the reservoir to maintain the burner upon interruption of a supply of oxygen from the extraction device.

6. The glass melting furnace system of claim 1, wherein the pressure of the gaseous mixture is from $1 \times 10^6$ Pa to $2 \times 10^6$ Pa.

7. The glass melting furnace system of claim 1, further comprising a compressor configured to employ energy from combustion gases from the oxy-combustion burner to direct the gaseous mixture.

8. The glass melting furnace system of claim 4, wherein the ceramic oxide electrode is a zirconium oxide-based electrode.

9. The glass melting furnace system of claim 1, wherein the entire oxygen supply to the oxy-combustion burner flows directly from the extraction device.

10. The glass melting furnace system of claim 1, wherein the extraction device is outside the glass melting furnace.

11. The glass melting furnace system of claim 1, further comprising:
 a gaseous mixture passage,
 wherein the first heat exchanger is connected to an exhaust exit of the glass melting furnace and the gaseous mixture passage is in contact with or passes through the first heat exchanger to heat the gaseous mixture and pass the gaseous mixture to the extraction device.

* * * * *